United States Patent
Martin et al.

(10) Patent No.: US 12,417,151 B2
(45) Date of Patent: Sep. 16, 2025

(54) HOST ANOMALY SNAPS

(71) Applicant: Dell Products L.P., Hopkinton, MA (US)

(72) Inventors: Owen Martin, Hopedale, MA (US); Vinay Rao, Bangalore (IN); Sanjib Mallick, Bangalore (IN); Arieh Don, Newton, MA (US)

(73) Assignee: Dell Products L.P., Hopkinton, MA (US)

( * ) Notice: Subject to any disclaimer, the term of this patent is extended or adjusted under 35 U.S.C. 154(b) by 43 days.

(21) Appl. No.: 18/584,366

(22) Filed: Feb. 22, 2024

(65) Prior Publication Data
US 2025/0272198 A1   Aug. 28, 2025

(51) Int. Cl.
*G06F 11/14*   (2006.01)

(52) U.S. Cl.
CPC ...... *G06F 11/1464* (2013.01); *G06F 11/1461* (2013.01)

(58) Field of Classification Search
CPC .................. G06F 11/1464; G06F 11/1461
USPC ................................................ 714/6.3
See application file for complete search history.

(56) References Cited

U.S. PATENT DOCUMENTS

2015/0373577 A1\* 12/2015 Yang ............... H04W 72/21
                                                                    455/435.1
2019/0369849 A1\* 12/2019 Gonzalez ............ G06T 1/20

OTHER PUBLICATIONS

Wikipedia "NMI" page (Year: 2024), retrieved from https://en.wikipedia.org/wiki/Non-maskable_interrupt.*

\* cited by examiner

*Primary Examiner* — Yair Leibovich
(74) *Attorney, Agent, or Firm* — Anderson Gorecki LLP

(57) ABSTRACT

Host-resident software such as a Multi-Path Input-Output (MPIO) driver generates notifications of scheduled host shutdowns and unscheduled host shutdowns. A storage node generates emergency snapshots of storage objects masked to the host server in response to receipt of an unscheduled shutdown notification. The storage node also generates emergency snapshots of storage objects masked to a host server in response to detection of a reboot sequence of the host server when a corresponding scheduled shutdown notification was not received beforehand.

20 Claims, 4 Drawing Sheets

HOST ANOMALY SNAPS

TECHNICAL FIELD

The subject matter of this disclosure is generally related to electronic data storage.

BACKGROUND

Data centers can include a large number of host servers and data storage nodes such as Network-Attached Storage (NAS), Storage Area Networks (SANs), and storage arrays. The data storage nodes maintain storage objects that can be contemporaneously accessed by instances of host applications running on the host servers. A scheduled shutdown of a host server includes steps such as flushing data from volatile memory to a storage node, where the data is stored on non-volatile drives. An unscheduled host server shutdown may occur due to a variety of anomalies including, but not limited to, a malware attack, hardware failure, or power loss. Data is not typically flushed to the storage node in the event of an unscheduled shutdown, so associated data on the storage objects may be inconsistent or corrupted. In the case of a forced shutdown perpetrated by malware, the storage objects maintained by the storage node may be targeted for attack after the host server is rebooted.

SUMMARY

A method in accordance with some implementations comprises: detecting reboot of a host server; determining whether shutdown of the host server preceding the reboot was a scheduled shutdown or an unscheduled shutdown; and responsive to a determination that the shutdown of the host server preceding the reboot was an unscheduled shutdown, generating an emergency snapshot of each storage object masked to the host server.

An apparatus in accordance with some implementations comprises a host server configured to detect reboot and determine whether shutdown of the host server preceding the reboot was a scheduled shutdown or an unscheduled shutdown; and a storage array configured to generate an emergency snapshot of each storage object masked to the host server responsive to a determination that the shutdown of the host server preceding the reboot was an unscheduled shutdown.

In accordance with some implementations a non-transitory computer-readable storage medium stores instructions that when executed by a computer cause the computer to perform a method comprising: detecting reboot of a host server; determining whether shutdown of the host server preceding the reboot was a scheduled shutdown or an unscheduled shutdown; and responsive to a determination that the shutdown of the host server preceding the reboot was an unscheduled shutdown, generating an emergency snapshot of each storage object masked to the host server.

This summary is not intended to limit the scope of the claims or the disclosure. Other aspects, features, and implementations will become apparent in view of the detailed description and figures. Moreover, all the examples, aspects, implementations, and features can be combined in any technically possible way.

DETAILED DESCRIPTION

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features, for example, and without limitation, abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
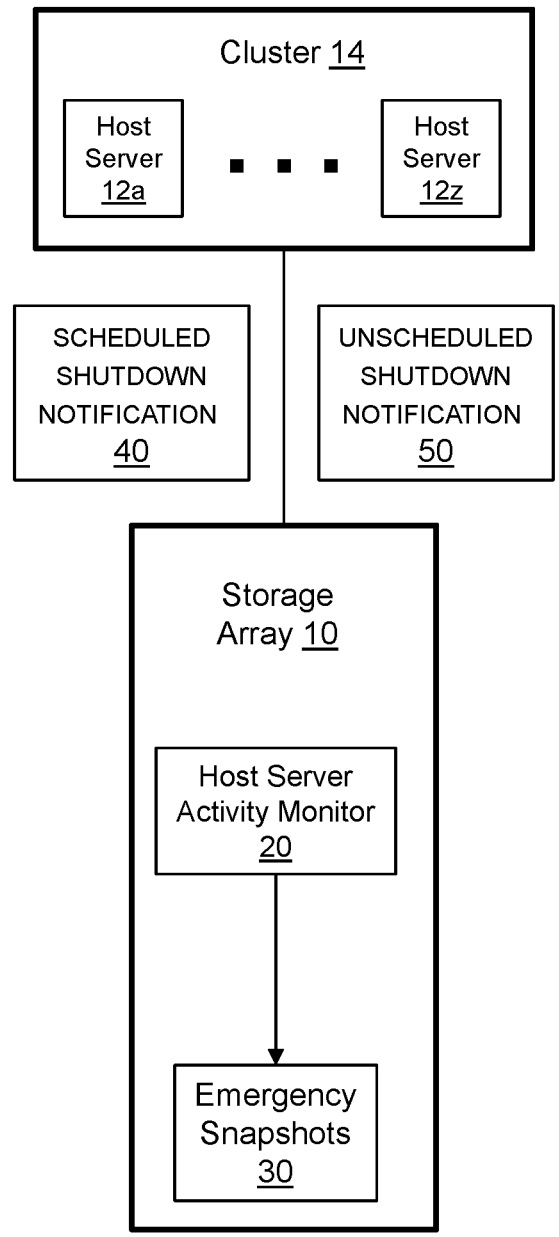
FIG. 1 illustrates a data center that includes clusters of host servers and a storage array with a host server activity monitor that generates emergency snapshots responsive to receipt and non-receipt of scheduled shutdown notifications and unscheduled shutdown notifications under certain conditions.

FIG. 1 illustrates a data center with a cluster 14 of host servers 12a-12z and a storage array 10 with a host server activity monitor 20 that generates emergency snapshots 30 responsive to receipt and non-receipt of scheduled shutdown notifications 40 and unscheduled shutdown notifications 50 under certain conditions. When a host server performs a scheduled shutdown, host-resident software on the host server is configured to generate and send a scheduled shutdown notification to inform the storage array that the upcoming shutdown is scheduled. The storage array registers the scheduled notification and when the host server later reboots the storage array does not generate emergency snapshots of the storage objects masked to the host server.

If the host server performs an unscheduled shutdown, then the host-resident software does not have an opportunity to send a notification to the storage array before the unscheduled shutdown occurs. However, the storage array will identify the reboot of the host server based on a recognizable sequence of small computer system interface (SCSI) commands such as Report-LUNs, inquiry utility (Inq), test unit ready (TUR), Read Capacity, and mode sense that are directed to each configured LUN on the storage array by the host server. A LUN is the logical unit number that identifies a storage object that can be accessed by the host server. Because the storage array wasn't notified that the shutdown was scheduled, the storage array will allow/execute any command from the host server other than write (WR), so the host reboot can be performed. The storage array holds the WR commands from the host server while waiting for a notification from the host-resident software indicating whether the shutdown was scheduled or not. If the host-resident software provides a notification that the shutdown was scheduled, then the storage array executes the held WR commands, and no emergency snapshot is generated. If the host-resident software provides a notification that the shutdown was unscheduled, then the storage array generates an emergency snapshot of each storage object masked to the host server and afterwards executes the held WR commands. If the host-resident software fails to provide a notification within a predetermined timeout period, e.g., 20 seconds, then the storage array generates an emergency snapshot of each storage object masked to the host server and afterwards executes the held WR commands. The host activity monitor can detect which storage objects are used by each host server by examining masking views and host-name reporting to the storage array, including associations between hostnames and host bus adapter world-wide names (HBA WWNs).

Figure 2:
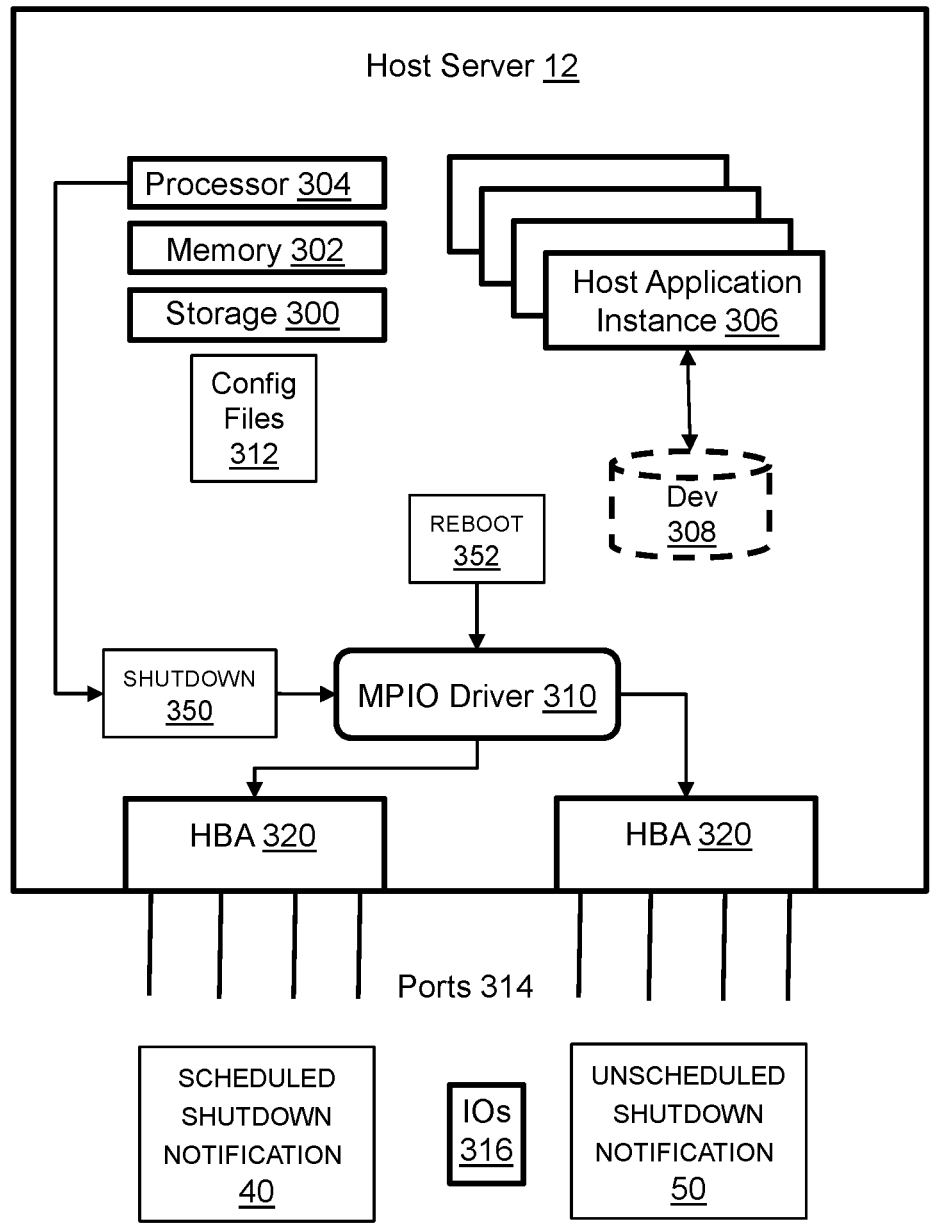
FIG. 2 illustrates a host server in greater detail.

FIG. 2 illustrates a host server 12 in greater detail. The host server includes volatile memory 302, non-volatile storage 300, one or more tangible processors 304 that support host application instances 306, ports 314, a Multi-Path Input-Output (MPIO) driver 310 running in a host kernel, and one or more host bus adapters (HBA) 320. Examples of host applications might include, but are not limited to, software for email, accounting, sales, inventory control, manufacturing, and a wide variety of other organizational functions. The MPIO driver 310 is configured to discover a storage object 152 (FIG. 3) that is maintained and presented by the storage array for use by host application instances 306. A corresponding logical host device 308 that is a representation of that storage object is generated locally for access by the host application instances 306. The instances of the host application use the logical host device 308 for data access, e.g., to read and write host application data to logical addresses. Corresponding RD/WR IOs 316 are generated and sent to the storage array via the MPIO driver 310 and HBAs 320 to access the storage object to read and write data. More specifically, the MPIO driver selects from among the multiple available paths between the host server and the storage array in order to balance IO loading. The IOs 316 are sent to the storage array via the host server and storage array ports corresponding to the selected paths. Configuration files 312 maintained by the host server include metadata that describes the paths supported by the host server. For example, the port IDs and authentication credentials for each supported path are included in the configuration files, which may be persistently stored in storage and copied into memory for low latency access during operation.

The MPIO driver 310 is configured to generate scheduled shutdown notifications 40 and unscheduled shutdown notifications 50. In the case of a scheduled shutdown, the kernel generates a shutdown command 350 that is provided to the MPIO driver 310. In response to receipt of the shutdown command 350, the MPIO driver performs an orderly shutdown. Prior to shutting down, the MPIO driver generates a scheduled shutdown notification 40 that is sent to the storage array to indicate that host server 12 is about to perform a scheduled shutdown. The kernel does not provide the shutdown command 350 to the MPIO driver in the event of an unscheduled shutdown. In response to detection of a reboot 352 following shutdown, the MPIO driver determines whether the shutdown was scheduled or unscheduled, e.g., by examining a log or journal of received commands and generated notifications. If the shutdown was scheduled, then the MPIO driver performs a normal boot operation. If the shutdown was unscheduled, then the MPIO driver generates an unscheduled shutdown notification 50 that is sent to the storage array. It should be understood that the MPIO driver is just one example of host-resident software that can be configured to detect host server reboot and generate scheduled shutdown notifications and unscheduled shutdown notifications.

Figure 3:
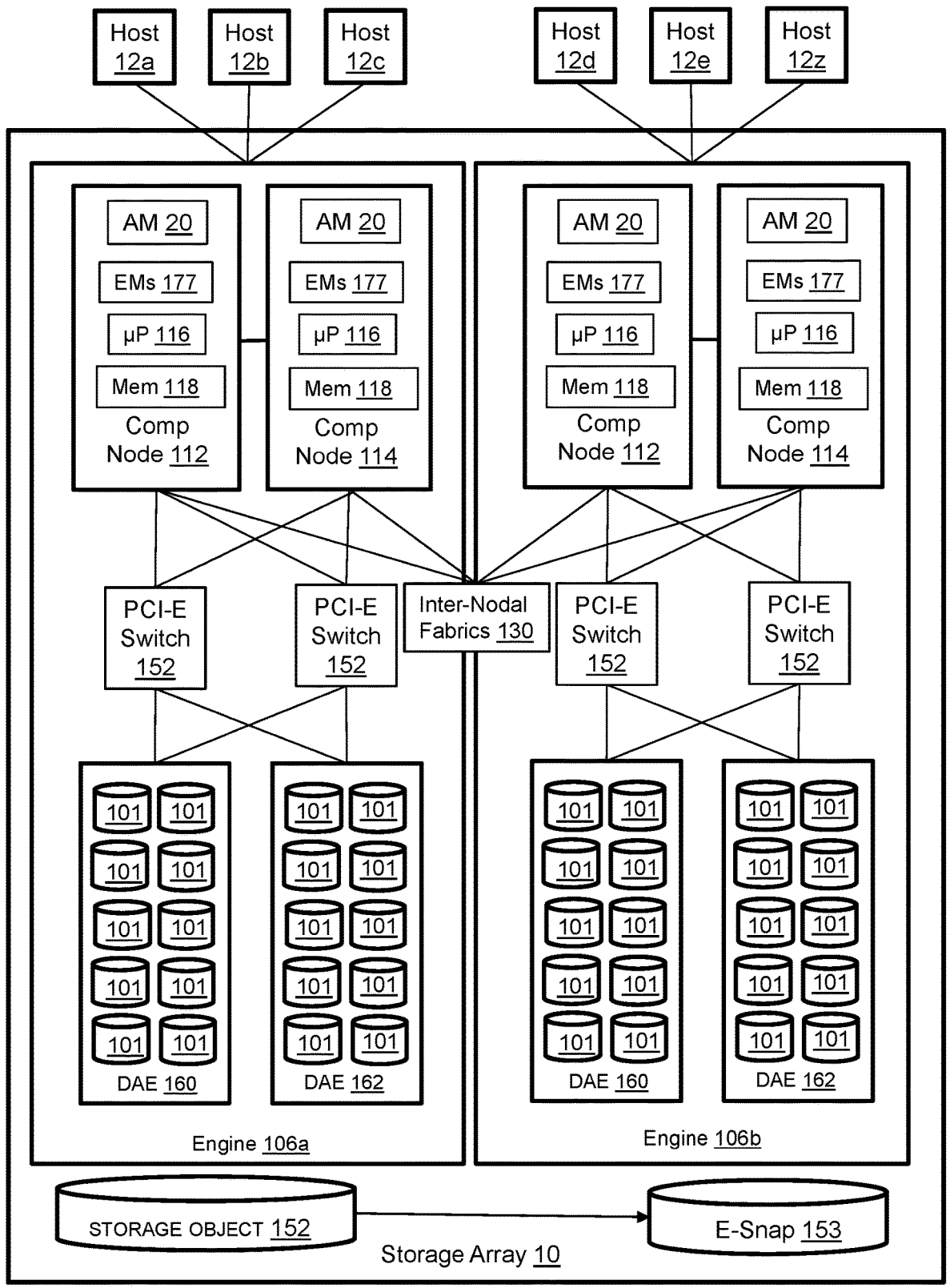
FIG. 3 illustrates the storage array in greater detail.

FIG. 3 illustrates storage array 10 in greater detail. The storage array is shown with two engines 106a, 106b, but might include any number of engines. The engines are interconnected via redundant inter-nodal channel-based InfiniBand fabrics 130. Each engine includes disk array enclosures (DAEs) 160, 162 and a pair of peripheral component interconnect express (PCI-e) interconnected compute nodes 112, 114 (aka storage directors) in a failover relationship. Within each engine, the compute nodes and DAEs are interconnected via redundant PCI-E switches 152. Each DAE includes managed drives 101 that are non-volatile storage media that may be of any type, e.g., solid-state drives (SSDs) based on nonvolatile memory express (NVMe) and EEPROM technology such as NAND and NOR flash memory.

Each compute node 112, 114 is implemented as a separate printed circuit board and includes resources such as at least one multi-core processor 116 and local memory 118. Processor 116 may include central processing units (CPUs), graphics processing units (GPUs), or both. The local memory 118 may include volatile media such as dynamic random-access memory (DRAM), non-volatile memory (NVM) such as storage class memory (SCM), or both. Each compute node includes one or more adapters and ports for communicating with host servers 12a-12z for servicing IOs from the host servers. Each compute node also includes one or more adapters for communicating with other compute nodes via the redundant inter-nodal channel-based InfiniBand fabrics 130. The processors 116 run threads of emulations (EMs 177) for performing different storage-related tasks and functions. Front-end emulations handle communications with the host servers 150. For example, front-end emulations receive IO commands from host servers and return data and write acknowledgements to the host servers. Back-end emulations handle communications with managed drives 101 in the DAEs 160, 162. Data services emulations process IOs. Remote data services emulations handle communications with other storage systems, e.g., other storage arrays for remote replication and remote snapshot creation. Instances of host server activity monitors 20 run on processors 116 and may exist in the memory and on the managed drives.

A host application image, which contains all data generated and used by a host application, is persistently stored on the managed drives 101 and logically stored on storage object 152. Storage object 152 is represented on the host servers as device 308 (FIG. 2). Without limitation, storage objects may be referred to as volumes, devices, or LUNs. From the perspective of the host servers, storage object 152 is a single disk or set of disks having logical block addresses (LBAs) on which data used by the instances of a host application resides. However, the host application data is stored at non-contiguous addresses distributed on the managed drives 101. Locally stored metadata maps between the LBAs of storage object 152 and physical addresses of the managed drives 101. There may be a large number of host servers running multiple host applications and the storage array may maintain a large number of storage objects. A host server that is registered with a storage array is characterized as being "zoned." Zoned host servers are not able to send RD/WR IOs to storage objects unless they are also masked to those storage objects. A masking view created and maintained by the storage array limits discovery of storage objects and access by host computers in accordance with authorizations as indicated by the masking view, so host applications cannot access the data of other host applications. A host server that is masked to at least one storage object is characterized as being "masked."

As already mentioned above, instances of the host server activity monitor 20 are configured to generate emergency snapshots of storage objects that are masked to host servers that perform unscheduled shutdown and reboot. For example, emergency snapshot 153 of storage object 152 is generated in response to an unscheduled shutdown of host server 12 (FIG. 2). Not all host servers will be masked to all storage objects maintained by the storage array, so only those storage objects masked to the host server that underwent an unscheduled shutdown are emergency-snapped. Non-emergency snapshots of the storage objects may also be generated according to a schedule as is known in the art.

Figure 4:
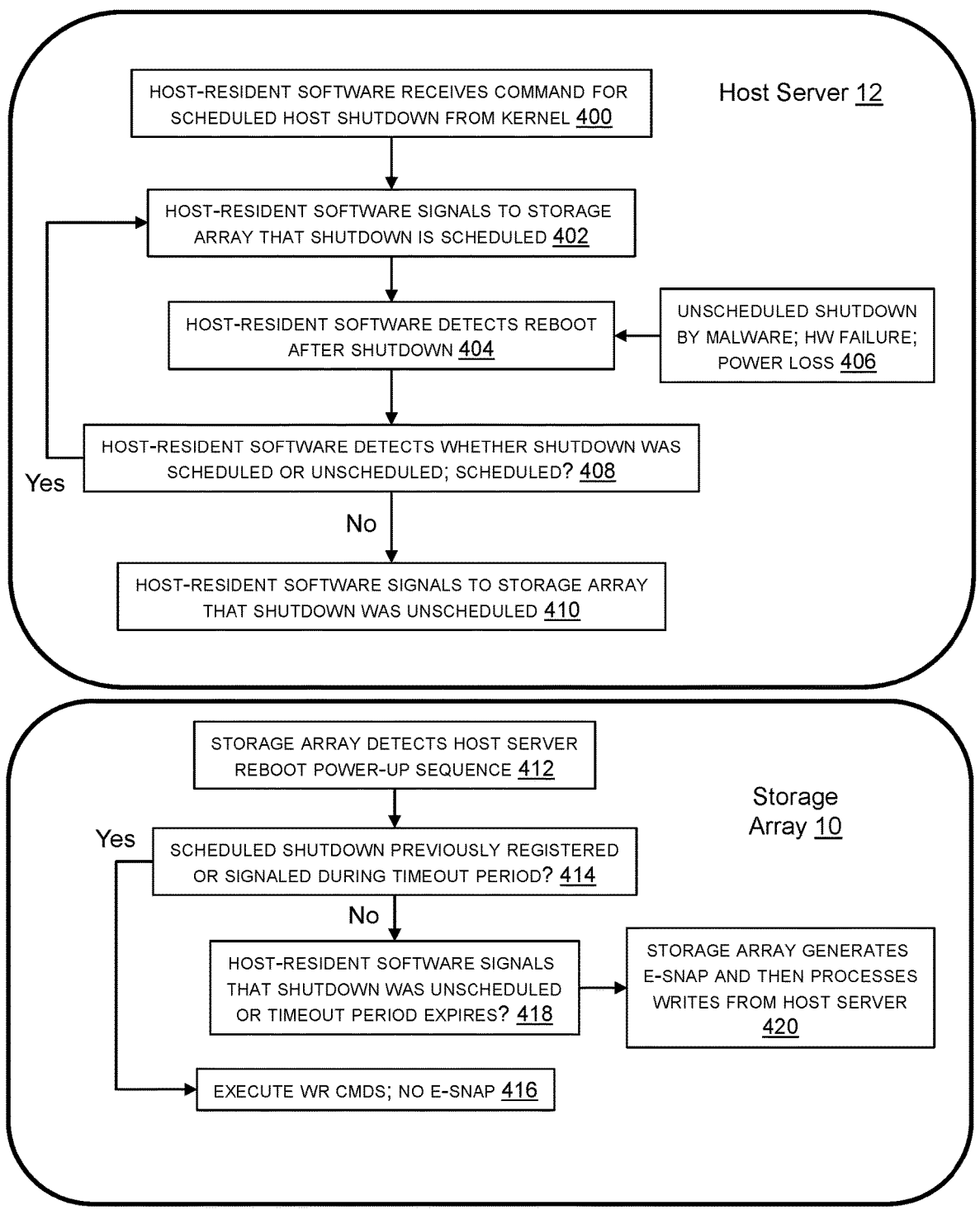
FIG. 4 illustrates the generation of scheduled shutdown notifications, unscheduled shutdown notifications, and emergency snapshots.

FIG. 4 illustrates the generation of scheduled shutdown notifications, unscheduled shutdown notifications, and emergency snapshots. In step 400 the host-resident software, e.g., MPIO driver, running on host server 12 receives a command from the host server kernel to perform a scheduled shutdown. In response, the host-resident software signals to the storage array in step 402 indicating that the host server is about to perform a scheduled shutdown (and reboot). This step may include generation and transmission of a scheduled shutdown notification that identifies the host server. In step 404 the host-resident software detects a host server reboot after a shutdown. The shutdown may be a scheduled shutdown associated with steps 400, 402 or an unscheduled shutdown caused by an anomaly such as malware, a hardware failure, power loss, or other reasons as indicated in step 406. In response, the host-resident software detects whether the shutdown was scheduled or unscheduled as indicated in step 408. This may include examining a log or journal of received commands and generated notifications. In the case in which the shutdown is determined to have been scheduled, a scheduled shutdown notification is generated in step 402. In the case in which the shutdown is determined to have been unscheduled, the host-resident software signals to the storage array indicating that the shutdown was unscheduled as shown in step 410. This may include generating and transmitting an unscheduled shutdown notification that identifies the host server.

In parallel with the steps described above, the storage array 10 passively monitors host server activity to detect any host server reboot based on a power-up sequence as indicated in step 412. This may include observing a sequence of SCSI commands such as Report-LUNs, Inq, TUR, Read Capacity, and mode sense, to each configured storage object. In response to detection of a power-up sequence, the storage array determines whether a corresponding scheduled shutdown was previously registered or a corresponding scheduled shutdown notification is received during a timeout period as indicated in step 414. In the case in which a scheduled shutdown was previously registered or a scheduled shutdown notification is received during the timeout period, WR commands from the host server are executed and no emergency snapshots are generated as indicated in step 416. If a scheduled shutdown was previously registered, then WR commands are not held. If a scheduled shutdown was not previously registered, then WR commands are held until the scheduled shutdown notification is received within the timeout period. In the case in which a scheduled shutdown was not previously registered and a scheduled shutdown notification is not received during the timeout period, or if an unscheduled shutdown notification is received, as indicated in step 418, then, the storage array generates emergency snapshots of all storage objects that are masked to the host server as indicated in step 420. Held WR commands from the host server are executed after the emergency snapshots are generated. Journal entries and warning messages may be generated each time an emergency snapshot is created.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method comprising:
   detecting reboot of a host server;
   determining whether shutdown of the host server preceding the reboot was a scheduled shutdown or an unscheduled shutdown; and
   responsive to a determination that the shutdown of the host server preceding the reboot was an unscheduled shutdown, generating an emergency snapshot of each storage object masked to the host server.

2. The method of claim 1 further comprising host-resident software receiving a command to perform a scheduled shutdown.

3. The method of claim 2 further comprising the host-resident software signaling to a storage array that the host server is performing a scheduled shutdown, in response to which the storage array executes write commands from the host server and does not generate an emergency snapshot of each storage object masked to the host server.

4. The method of claim 1 further comprising the host-resident software detecting the reboot of the host server following the shutdown and a storage array holding write commands while executing other commands from the host server pending determining whether shutdown of the host server preceding the reboot was a scheduled shutdown or an unscheduled shutdown.

5. The method of claim 4 further comprising the host-resident software determining that the shutdown of the host server preceding the reboot was an unscheduled shutdown and signaling to a storage array indicating that the shutdown was unscheduled.

6. The method of claim 5 further comprising the storage array generating an emergency snapshot of each storage object masked to the host server in response to receipt of the signaling indicating that the shutdown was unscheduled, the write commands from the host server being held until all emergency snapshots have been generated and thereafter executed.

7. The method of claim 1 further comprising a storage array holding write commands and generating an emergency snapshot of each storage object masked to the host server in response to detecting a second reboot of the host server and determining that host-resident software on the host server did not signal that the host server was performing a corresponding scheduled shutdown or unscheduled shutdown within a timeout period, the storage array executing the write commands from the host server after generating the emergency snapshot of each storage object masked to the host server.

8. An apparatus comprising:
a host server configured to detect reboot and determine whether shutdown of the host server preceding the reboot was a scheduled shutdown or an unscheduled shutdown; and
a storage array configured to generate an emergency snapshot of each storage object masked to the host server responsive to a determination that the shutdown of the host server preceding the reboot was an unscheduled shutdown.

9. The apparatus of claim 8 further comprising host-resident software configured to receive a command from a kernel to perform a scheduled shutdown.

10. The apparatus of claim 9 further comprising the host-resident software configured to signal to the storage array that the host server is performing a scheduled shutdown, in response to which the storage array executes write commands from the host server and does not generate an emergency snapshot of each storage object masked to the host server.

11. The apparatus of claim 8 further comprising the host-resident software configured to detect the reboot of the host server following the shutdown and the storage array configured to hold write commands while executing other commands from the host server pending determining whether shutdown of the host server preceding the reboot was a scheduled shutdown or an unscheduled shutdown.

12. The apparatus of claim 11 further comprising the host-resident software configured to determine that the shutdown of the host server preceding the reboot was an unscheduled shutdown and signal to the storage array indicating that the shutdown was unscheduled.

13. The apparatus of claim 12 further comprising the storage array configured to generate an emergency snapshot of each storage object masked to the host server in response to receipt of signaling indicating that the shutdown was unscheduled, the write commands from the host server being held until the all emergency snapshots have been generated and thereafter executed.

14. The apparatus of claim 8 further comprising the storage array configured to hold write commands and generate an emergency snapshot of each storage object masked to the host server in response to detecting a second reboot of the host server and the host-resident software on the host server failing to signal that the host server was performing a corresponding scheduled shutdown or unscheduled shutdown within a timeout period, the storage array executing the write commands from the host server after generating the emergency snapshot of each storage object masked to the host server.

15. A non-transitory computer-readable storage medium storing instructions that when executed by a computer cause the computer to perform a method comprising:
detecting reboot of a host server;
determining whether shutdown of the host server preceding the reboot was a scheduled shutdown or an unscheduled shutdown; and
responsive to a determination that the shutdown of the host server preceding the reboot was an unscheduled shutdown, generating an emergency snapshot of each storage object masked to the host server.

16. The non-transitory computer-readable storage medium of claim 15 in which the method further comprises host-resident software receiving a command to perform a scheduled shutdown and signaling to a storage array that the host server is performing a scheduled shutdown, in response to which the storage array executes write commands from the host server and does not generate an emergency snapshot of each storage object masked to the host server.

17. The non-transitory computer-readable storage medium of claim 15 in which the method further comprises a host-resident software detecting the reboot of the host server following the shutdown and a storage array holding write commands while executing other commands from the host server pending determining whether shutdown of the host server preceding the reboot was a scheduled shutdown or an unscheduled shutdown.

18. The non-transitory computer-readable storage medium of claim 17 in which the method further comprises the host-resident software determining that the shutdown of the host server preceding the reboot was an unscheduled shutdown and signaling to a storage array indicating that the shutdown was unscheduled.

19. The non-transitory computer-readable storage medium of claim 18 in which the method further comprises the storage array generating an emergency snapshot of each storage object masked to the host server in response to receipt of the signaling indicating that the shutdown was unscheduled, the write commands from the host server being held until the emergency snapshots have been generated and thereafter executed.

20. The non-transitory computer-readable storage medium of claim 15 in which the method further comprises a storage array holding write commands and generating an emergency snapshot of each storage object masked to the host server in response to detecting a second reboot of the host server and determining that host-resident software on the host server did not signal that the host server was performing a corresponding scheduled shutdown or unscheduled shutdown within a timeout period, the storage array executing the write commands from the host server after generating the emergency snapshot of each storage object masked to the host server.

* * * * *